United States Patent Office 3,632,823
Patented Jan. 4, 1972

3,632,823
ALKYLATION WITH ORGANOBORANES
Herbert C. Brown, 1840 Garden St.,
West Lafayette, Ind. 47906
No Drawing. Filed Dec. 26, 1968, Ser. No. 787,272
Int. Cl. C11c 3/00
U.S. Cl. 260—408    21 Claims

ABSTRACT OF THE DISCLOSURE

Many organic compounds containing hydrogen in the alpha position to an activating group, such as aldehydes, ketones, esters, nitriles, sulfones, and nitro compounds, are readily transformed into the corresponding carbanions by treatment with an appropriate base. Such carbanions containing one or two halogen atoms in the alpha position are captured by organoboranes producing the corresponding aldehyde, ketone, ester, nitrile, sulfone, or nitro compound containing one or two organo substituents in the alpha position in place of the original halogen substituent.

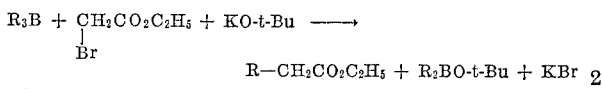

$$R-CH_2CO_2C_2H_5 + R_2BO\text{-}t\text{-}Bu + KBr$$

The α-halocarbanion may either be preformed and reacted subsequently with the organoborane in a subsequent stage, or the α-halocarbanion may be produced in the presence of the organoborane. This development makes it possible to synthesize a wide variety of organic derivatives. Such organic compounds are valuable intermediates in organic synthesis.

BACKGROUND OF THE INVENTION

(I) Field of invention

This invention relates to a completely novel process for the preparation of aldehydes, ketones, esters, nitriles, sulfones, and nitro compounds by alkylating alpha halogen derivatives of such compounds with organoboranes. Such organoboranes are now readily available via the Grignard reaction or hydroboration. Consequently, the process provides an entirely new means for introducing organic groups, both alkyl and aryl, with or without substituents, into the alpha position, yielding derivatives containing longer chains, alicyclic rings, aryl groups, etc. Thus this reaction provides a highly useful process for modifying the carbon structure of a wide variety of derivatives.

(II) Description of the prior art

It is well known that hydrogen that is alpha to certain activating groups are relatively acidic and are ionized by appropriate bases.

| | pKa |
|---|---|
| $C_6H_5COCH_3 + B \rightleftharpoons C_6H_5COCH_2^- + BH^+$ | 19 |
| $CH_3CO_2C_2H_5 + B \rightleftharpoons {}^-CH_2CO_2C_2H_5 + BH^+$ | 24 |
| $CH_3SO_2CH_3 + B \rightleftharpoons {}^-CH_2SO_2CH_2^- + BH^+$ | 23 |
| $CH_3NO_2B \rightleftharpoons {}^-CH_2NO_2 + BH^+$ | 10 |
| $CH_3CN + B \rightleftharpoons {}^-CH_2CN + BH^+$ | 25 |

(See H. O. House, "Modern Synthetic Reactions," W. A. Benjamin, Inc., N.Y. 1965, p. 164.)

Such carbanions are highly reactive and are the essential intermediates in many condensation reactions. Because of the wide range of acidity in these derivatives, various bases are used to form the carbanion in situ. Frequently no attempt is made to isolate the carbanion as such, but it is formed in minute amounts in situ, in the presence of carbanion acceptors. (See H. O. House, Modern Synthetic Reactions, W. A. Benjamin, Inc., N.Y., 1965, chapters 7 and 8.)

For example, in the Darzens glycidic ester condensation an α-halo ester is converted to the carbanion by potassium t-butoxide in tertiary butyl alcohol in the presence of a carbanion acceptor. The intermediate condensation product then undergoes intramolecular ring closure to form the glycidic ester. A typical example is the condensation of ethyl α-chloroacetate with cyclohexanone.

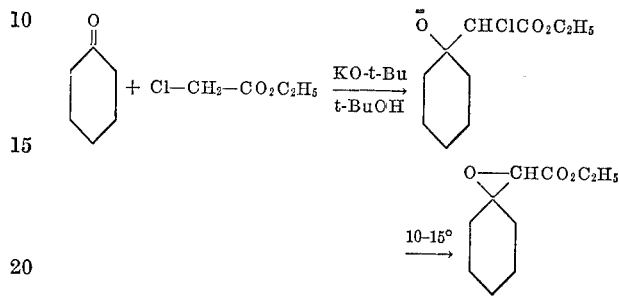

Since the carbanion is a highly reactive intermediate which is capable of adding to the ester group, it is essential to have an efficient acceptor for the carbanion to minimize undersirable side reactions.

Benzaldehyde is a suitable acceptor, as illustrated by the following example.

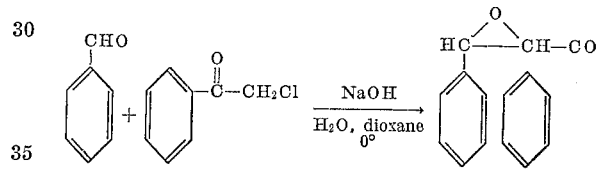

Note that in this case sodium hydroxide is adequate as the base.

Organoboranes are strong Lewis acids which readily coordinate with bases.

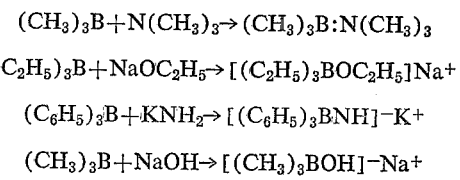

Consequently, it is quite unexpected that such organoboranes serve as efficient acceptors for α-halo substituted carbanions, generated from the α-halo derivative by strong base. The resulting intermediate formed from the organoborane and the α-halo substituted carbanion rapidly exchanges the halogen atom with an organo group on boron. Hydrolysis then yields a derivative in which the organo group takes the place of the original halogen substituent.

There does not appear to be any prior art whatsoever in which an organoborane has been used as an acceptor to react with preformed α-halo substituted carbanions generated in situ by the action of bases.

Organoboranes are now readily available from the hydroboration of unsaturated organic compounds. (See H. C. Brown, "Hydroboration," W. A. Benjamin, Inc., N.Y., 1962). Consequently, it is now possible to convert such unsaturated organic compounds to the organoboranes and then transfer the resulting organo groups to the alpha position of various functional derivatives. Triarylboranes can be synthesized by the reaction of the Grignard reagents with boric acid esters or halides. These can be used in the present process to introduce aryl substituents in the α-position.

SUMMARY OF THE INVENTION

Ethyl α-bromoacetate does not react with organoboranes, such as triethylborane, in the absence of added base. Indeed, an equimolar mixture of triethylborane and α-bromoacetate can be refluxed in tetrahydrofuran for days without observable reaction. However, the addition of one mole of potassium t-butoxide in t-butyl alcohol to a mixture of one mole of triethylborane and ethyl α-bromoacetate at 0° results in an instantaneous reaction, with the formation of a 98% yield of ethyl n-butyrate.

$$(C_2H_5)_3B + CH_2BrCO_2C_2H_5 + KO\text{-}t\text{-}Bu \xrightarrow{0°}$$
$$C_2H_5CH_2CO_2C_2H_5 + (C_2H_5)_2BO\text{-}t\text{-}Bu + KBr$$

Apparently, a wide variety of organic groups can be accommodated in this reaction, as shown by the following reactions.

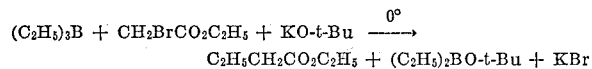

$$CH_2{=}CH_2 \longrightarrow (C_2H_5)_3B \longrightarrow \underset{98\%}{CH_3CH_2CH_2CO_2C_2H_5}$$

$$CH_3CH_2CH{=}CH_2 \longrightarrow (n\text{-}C_4H_9)_3B \longrightarrow \underset{93\%}{CH_3(CH_2)_4CO_2C_2H_5}$$

$$CH_3CH{=}CHCH_3 \longrightarrow (sec\text{-}C_4H_9)_3B \longrightarrow$$
$$\underset{80\%}{CH_3CH_2CH(CH_3)CH_2CO_2C_2H_5}$$

$$(CH_3)_2C{=}CH_2 \longrightarrow (i\text{-}C_4H_9)_3B \longrightarrow \underset{98\%}{(CH_3)_2CHCH_2CH_2CO_2C_2H_5}$$

$$CH_3(CH_2)_3CH{=}CH_2 \longrightarrow (n\text{-}C_6H_{13})_3B \longrightarrow \underset{93\%}{CH_3(CH_2)_6CO_2C_2H_5}$$

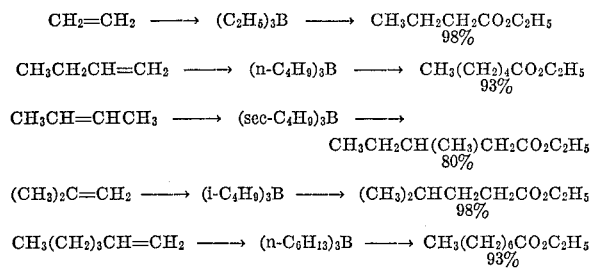

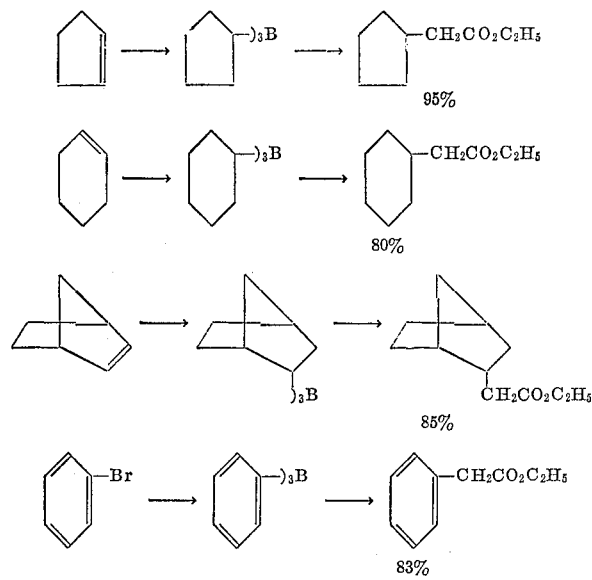

Ethyl chloroacetate and ethyl iodoacetate may also be used. The particular ester utilized appears to be relatively unimportant. Thus, t-butyl, n-butyl, or isobutyl α-bromoacetate give excellent yields of the alkylated esters.

Arylboranes, such as triphenylboro, although not available via hydroboration, will undergo this reaction with α-halo carbanions.

Ethyl dibromoacetate also undergoes the reaction. If one mole of the base is added to one mole of the organoborane and one mole of ethyl dibromoacetate, there is obtained the α-bromo ester.

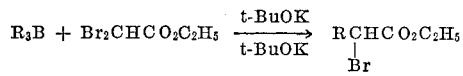

The dichloro derivative reacts similarly.

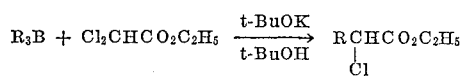

If two moles of base and two moles of the organoborane are utilized, dialkylation is achieved.

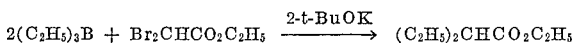

The dialkylation can be achieved in two successive stages, permitting the introduction of two different organic groups into the acetic acid moiety.

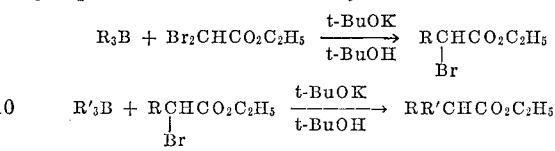

Thus the reaction provides an alternative to the commonly used malonic ester synthesis for the preparation of disubstituted acetic acids.

For example ethyl dibromoacetate can be alkylated with triethylborane and potassium t-butoxide to yield ethyl α-bromo-n-butyrate. This can then be alkylated with tri-n-hexyborane and potassium t-butoxide to yield the ethyl ester of ethyl-n-hexylacetic acid.

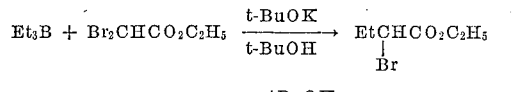

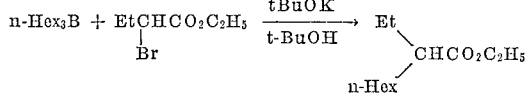

Or the two groups may be introduced in the opposite order.

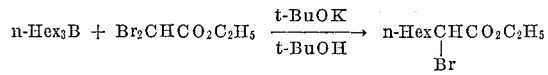

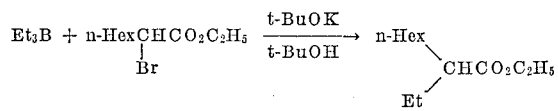

The procedure utilized is both simple and rapid. The olefin in tetrahydrofuran is converted into the organoborane by addition of the calculated quantity of diborane in the same solvent. Or preformed organoborane may be used. The α-halo ester is added, followed by the addtion of the appropriate quantity of potassium t-butoxide in t-butyl alcohol. The reactions are exceedingly rapid, being essentially over as soon as the addition of base has been completed. The reaction product can be distilled directly from the mixture.

In this reaction only one of the three alkyl groups on the organoborane is conveniently utilized. However, by use of potassium t-butoxide in tetrahydrofuran, it is possible to use more than one group. Alternatively the dialkylborinic acid ester can be disproportionated to form a boric acid ester and the trialkylborane and the latter recycled to the reaction. Thus all of the organic groups on boron can ultimately be utilized.

Typical data are summarized in the following equations.

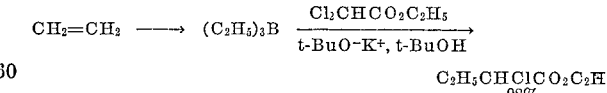

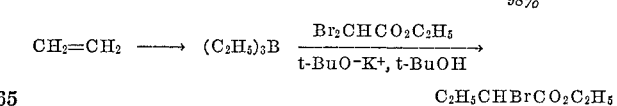

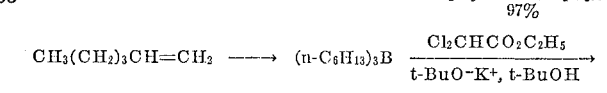

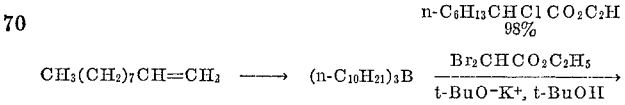

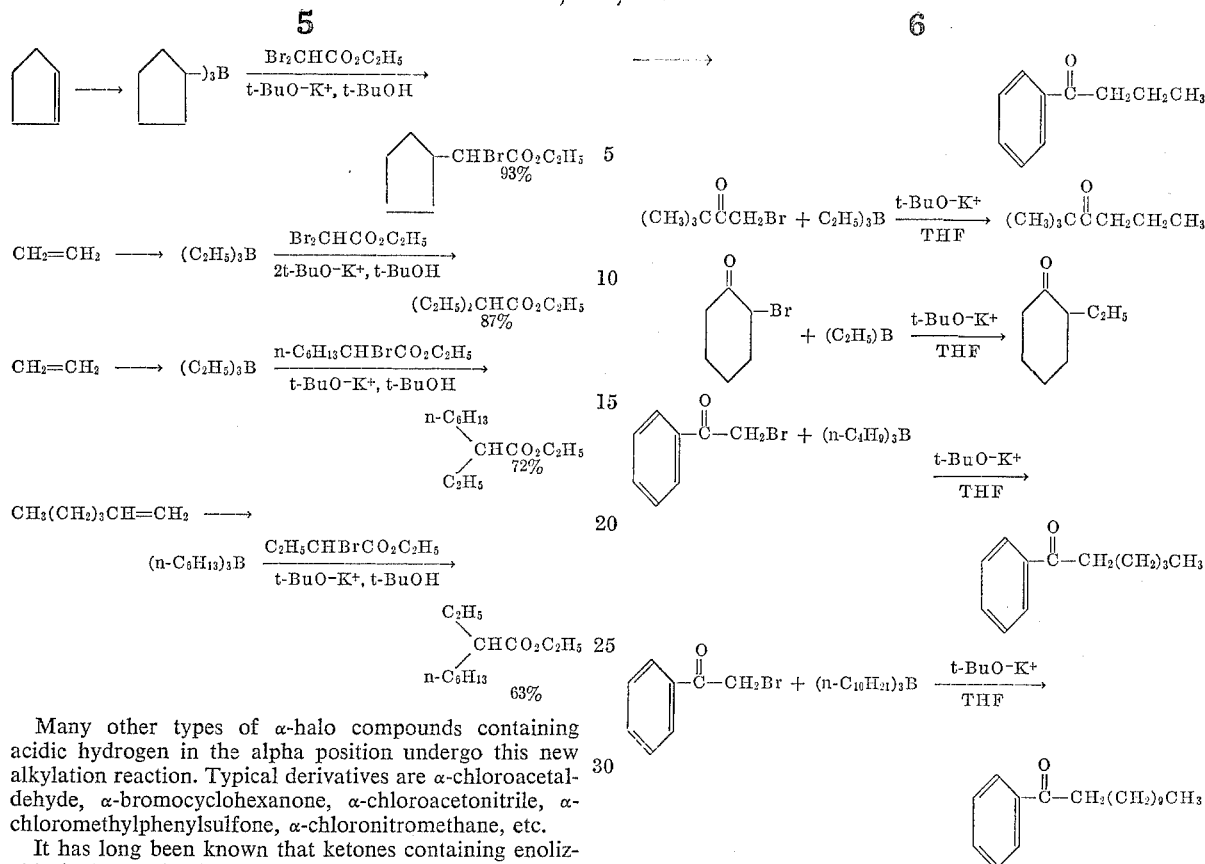

Many other types of α-halo compounds containing acidic hydrogen in the alpha position undergo this new alkylation reaction. Typical derivatives are α-chloroacetaldehyde, α-bromocyclohexanone, α-chloroacetonitrile, α-chloromethylphenylsulfone, α-chloronitromethane, etc.

It has long been known that ketones containing enolizable hydrogen in the alpha position can be alkylated by treating the ketone with sodamide or a similar strong base and an appropriate alkyl halide. A major difficulty with this reaction is that it is difficult to control the introduction of a single alkyl group. The reaction frequently proceeds to the production of a wide range of the possible alkylated products, and frequently chemical methods must be used to isolate a single product from the mixture. This has led to the use of blocking groups, on the one hand, and to the use of enamines, on the other, to control such alkylation.

This difficulty is avoided by the present procedure. In alkylating ketones with organoboranes potassium t-butoxide in tetrahydrofuran gave better yields than potassium t-butoxide in t-butyl alcohol.

At 0° phenacylbromide reacts practically instantaneously with triethylborane in the presence of the base to give an essentially quantitative yield of n-butyrophenone.

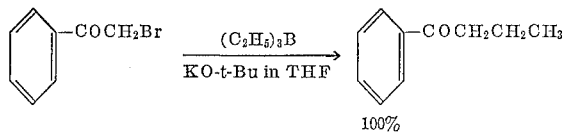

The reaction of α-bromocyclohexanone is considerably slower, but even this proceeds relatively smoothy! to give 68% of α-ethycyclohexanone in approximately 12 hours at 0°.

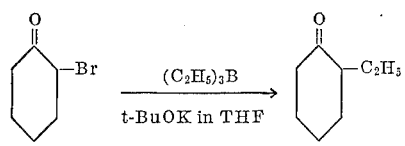

Representative results are summarized in the following equations.

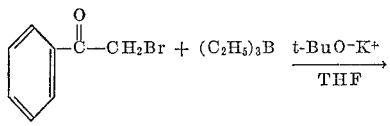

Just as in the corresponding condensation reactions (H. O. House, "Modern Synthetic Reactions," W. A. Benjamin, Inc., 1965, chapters 7 and 8), it is frequently necessary to adjust the base to the particular reaction. Thus, potassium t-butoxide in t-butyl alcohol and potassium t-butoxide in tertahydrofuran gave equally satisfactory results with ethyl α-haloacetate. On the other hand, the α-haloketones, such as phenacyl bromide, gave much better results with potassium t-butoxide in tetrahydrofuran than with potassium t-butoxide in t-butyl alcohol.

In other cases the use of a more hindered base, such as the potassium salt of triethylcarbinol offers advantages. In others we have found that the use of sodium diisopropylamide is favorable. Occasionally, sodium triphenylmethide gives the best yield. In some cases the use of sodium hydride is highly satisfactory. For easily ionizable derivatives, such as α-chloronitromethane and α-chloroacetaldehyde, the use of hindered tertiary bases, such as 2,6-lutidine or collidine is promising. In some cases involving very easily enolizable alpha hydrogen, simple alkali, such as sodium or potassium hydroxide serves.

Just as in the case of the corresponding condensation reaction it is not always possible to predict which base will be most favorable in a particular instant. At present, this can only be established by experiment. However, in every case a useful base must be one that is sufficiently strong to ionize the α-halo derivative.

DESCRIPTION OF THE EMBODIMENTS

The invention will be further understood by reference to the following examples.

EXAMPLE I

The following procedure is representative for the alkylation of an α-halo ester. A dry 500 ml. flask equipped with a septum inlet, thermometer well, pressure-equalizing dropping funnel, and magnetic stirrer was flushed with nitrogen and then maintained under a static pressure of the gas. The flask was charged with 50 ml. of tetrahydrofuran and 13.3 ml. (150 mmoles) of cyclopentene, and then cooled in an ice bath. Conversion to tricyclopentylborane was achieved by dropwise addition of 25 ml. of a 2.00 M solution of borane (150 mmoles of hydride) in tetrahydrofuran. The solution was stirred for 1 hr. at 25° and again cooled in an ice bath, and 25 ml. of dry t-butyl alcohol was added, followed by 5.5 ml. (50 mmoles) of ethyl bromoacetate. Potassium t-butoxide in t-butyl alcohol (50 ml. of a 1.00 M. solution) was added over a period of 10 min. There was an immediate precipitate of potassium bromide. GLPC analysis of the reaction mixture, following addition of n-octane as internal standard, indicated a 95% yield of ethyl cyclopentylacetate. The reaction mixture was filtered from the potassium bromide and distilled. There was obtained 5.85 g. (75% yield) of ethyl cyclopentyl-acetate, B.P. 101° (30 mm.), $n_D^{20}$ 1.4398, ir spectrum identical with literature spectrum.

Typical results are summarized in Table I.

TABLE I.—CONVERSION OF OLEFINS INTO ESTERS BY REACTION OF THE CORRESPONDING ORGANOBORANES WITH α-HALO ESTERS UNDER THE INFLUENCE OF BASE

| Organoboranes from olefin | $R_3B$, mmole | Halogen derivative | RX, mmole | t-BuO-K+, mmole | Temp., °C. | Product | Yield, percent |
|---|---|---|---|---|---|---|---|
| Ethene | 100 | $BrCH_2CO_2C_2H_5$ | 100 | 100 | 0 | $C_2H_5CH_2CO_2C_2H_5$ | 98 |
| Do | 100 | $ClCH_2CO_2C_2H_5$ | 100 | 100 | 0 | $C_2H_5CH_2CO_2C_2H_5$ | 77 |
| Do | 100 | $ICH_2CO_2C_2H_5$ | 100 | 100 | 0 | $C_2H_5CH_2CO_2C_2H_5$ | 69 |
| 1-butene | 100 | $BrCH_2CO_2C_2H_5$ | 100 | 100 | 0 | $CH_3(CH_2)_3CH_2CO_2C_2H_5$ | 93 |
| 2-butene | 100 | $BrCH_2CO_2C_2H_5$ | 100 | 100 | 0 | $CH_3CH_2CH(CH_3)CH_2CO_2C_2H_5$ | 80 |
| Isobutene | 100 | $BrCH_2CO_2C_2H_5$ | 100 | 100 | 0 | $(CH_3)_2CHCH_2CH_2CO_2C_2H_5$ | 98 |
| 1-hexene | 100 | $BrCH_2CO_2C(CH_3)_3$ | 100 | 100 | 0 | $CH_3(CH_2)_5CH_2CO_2C(CH_3)_3$ | 83 |
| 1-cetene | 100 | $ClCH_2CO_2C_2H_5$ | 100 | 100 | 0 | $CH_3(CH_2)_{15}CH_2CO_2C_2H_5$ | 78 |
| Cyclopentene | 100 | $BrCH_2CO_2C_2H_5$ | 100 | 100 | 0 | $(CH_2)_4CHCH_2CO_2C_2H_5$ | 95 |
| Cyclohexene | 100 | $BrCH_2CO_2C_2H_5$ | 100 | 100 | 0 | $(CH_2)_5CHCH_2CO_2C_2H_5$ | 80 |
| Norbornene | 100 | $BrCH_2CO_2C_2H_5$ | 100 | 100 | 0 | 2-norbornyl-$CH_2CO_2C_2H_5$ | 85 |

EXAMPLE II

The following procedure illustrates the synthesis of α-halo esters.

A dry 500-ml. flask, equipped with a septum inlet, thermometer well, pressure-equalizing dropping funnel, and magnetic stirrer, was flushed with nitrogen and maintained under a static pressure of the gas. The flask was charged with 100 ml. of tetrahydrofuran and 37.7 ml. (300 mmol) of 1-hexene, and then cooled in an ice bath. Hydroboration was achieved by dropwise addition of 50 ml. of a 2.0 M solution of borane (300 mmol of hydride) in tetrahydrofuran. The solution was stirred for 1 hr. at room temperature and again cooled in an ice bath, and 50 ml. of dry t-butyl alcohol was added, followed by 13.0 (100 mmol) of ethyl dibromoacetate. Potassium t-butoxide in t-butyl alcohol (100 ml. of 1.0 M solution) was added over a period of 30 min. There was an immediate percipitate of potassium bromide. GLPC analysis of the reaction mixture, following addition of n-octane as internal standard, indicated a 98% yield of ethyl α-bromooctanoate. To the reaction mixture was then aded 30 ml. of 3 N sodium acetate, followed by dropwise addition of 12 ml. of 30% hydrogen peroxide, maintaining the temperature below 10°. The reaction mixture was stirred at room temperature for 30 min. and then saturated with sodium chloride.

The organic layer was separated, dried over magnesium sulfate, and distilled. There was obtained 21.3 g. (85% yield) of ethyl α-bromooctanoate, B.P. 112–114° (9 mm.). The product exhibited ir and nmr spectra in accordance with its structure.

TABLE II.—CONVERSION OF OLEFINS INTO ETHYL 2-BROMOALKANOATES, 2-CHLOROALKANOATES, AND DIALKYLACETATES BY REACTION OF THE CORRESPONDING ORGANOBORANES WITH α-HALO-ALKANOATES UNDER THE INFLUENCE OF POTASSIUM t-BUTOXIDE

| Organoboranes from olefin | $R_3B$, mmol | Halogen derivative | RX, mmol | t-BuO-K+, mmol | Temp., °C. | Product | Yield, percent [a] |
|---|---|---|---|---|---|---|---|
| Ethene [b] | 10.0 | $Br_2CHCO_2Et$ | 10.0 | 10.0 | 0 | $C_2H_5CHBrCO_2Et$ | 97 |
|  | 50.0 | $Cl_2CHCO_2Et$ | 50.0 | 50.0 | 0 | $C_2H_5CHClCO_2Et$ | 98 |
| 1-hexene | 100 | $Br_2CHCO_2Et$ | 100 | 100 | 0 | $CH_3(CH_2)_5CHBrCO_3Et$ | 98 |
|  | 50.0 | $Cl_2CHCO_2Et$ | 50.0 | 50.0 | 0 | $CH_3(CH_2)_5CHClCO_2Et$ | 98 |
| 1-decene | 100 | $Br_2CHCO_2Et$ | 100 | 100 | 0 | $CH_3(CH_2)_9CHBrCO_2Et$ | 92 |
| 2-butene | 50.0 | $Br_2CHCO_2Et$ | 50.0 | 50.0 | 0 | $C_2H_5(CH_3)CHCHBrCO_2Et$ | 80 |
| Isobutylene | 50.0 | $Br_2CHCO_2Et$ | 50.0 | 50.0 | 0 | $(CH_3)_2CHCH_2CHBr$ | 85 |
| Cyclopentene | 50.0 | $Br_2CHCO_2Et$ | 50.0 | 50.0 | 0 | $(CH_2)_4CHCHBrCO_2Et$ | 93 |
|  | 20.0 | $Br_2CHCO_3Et$ | 10.0 | 20.0 | 0 | $(C_2H_5)_2CHCO_2Et$ | 60 |
| Ethene [b] | 20.0 | $Br_2CHCO_2Et$ | 10.0 | 20.0 | 50 | $(C_2H_5)_2CHCO_2Et$ | 69 |
|  | 10.0 | $C_2H_5CHBrCO_2Et$ | 10.0 | 10.0 | 50 | $(C_2H_5)_2CHCO_2Et$ | 87 |
|  | 10.0 | $CH_3(CH_2)_5CHBrCO_2Et$ | 10.0 | 10.0 | 50 | $CH_3(CH_2)_5(C_2H_5)CHCO_2Et$ | 72 [c] |
| 1-hexene | 100 | $C_2H_5CHBrCO_2Et$ | 100 | 100 | 50 | $CH_3(CH_2)_5(C_2H_5)CHCO_2Et$ | 63 |

[a] By GLPE analysis. The yield is based on halogen derivative.   [b] Commercial triethylborane was used.
[c] 30% of the α-t-butoxy derivative formed.

EXAMPLE III

The following procedure is representative of those used for the dialkylation of ethyl dibromoacetate.

A dry 100 ml. flask fitted with a septum inlet, thermometer, pressure-equalizing dropping funnel, and magnetic stirrer was flushed with nitrogen. The flask was charged with 10 ml. of tetrahydrofuran, and 20 mmole of triethylborane was added. Then 10 mmole of ethyl dibromoacetate was added. The temperature was raised to 50° and 20 mmole of potassium t-butoxide in 20 ml. of t-butyl alcohol was added over a period of 10 minutes. There was an immediate precipitate of potassium bromide. GLPC analysis of the reaction mixture showed a 60% yield of ethyl diethylacetate.

EXAMPLE IV

The following procedure utilizes potassium t-butoxide in tetrahydrofuran.

The procedure was identical to that reported in Example III. However, instead of the potassium t-butoxide in t-butyl alcohol there was used potassium t-butoxide in tetrahydrofuran. Moreover, the temperature was maintained at 0°. There was obtained an 86% yield of ethyl diethylacetate.

Representative results are summarized in Table II.

EXAMPLE V

Similar to the last example, better results are realized in the alkylation of α-haloketones using potassium t-butoxide in tetrahydrofuran than potassium t-butoxide in t-butyl alcohol.

The following synthesis of α-ethylcyclohexanone is representative. The synthesis of α-bromocyclohexanone is illustrated by the following procedure. A one-l. round bottom flask was equipped with a mechanical stirrer and water condenser. Cupric bromide (223 g., 1.0 M) was placed in the flask together with 500 ml. of a 1/1 mixture of ethyl acetate and chloroform containing 49 g. (0.5

M) of cyclohexanone. The system was attached to a water aspirator and a pressure sufficient to achieve gentle refluxing of the solvent was maintained. Stirring was then started and the evolution of hydrogen bromide began immediately. After one hour, the disappearance of the black cupric bromide was almost complete. The solution was filtered to remove the white precipitate of cuprous bromide and extracted with three 100 ml. portions of a saturated solution of sodium bicarbonate. Removal of the solvent and distillation under reduced pressure gave 53 g. (60%) of α-bromocyclohexanone, B.P. 66°/2 mm. A slight red color in the product could be removed by crystallization from pentane at −72°.

The following procedure for the conversion of α-bromocyclohexanone into 2-ethylcyclohexanone is representative. A 50 ml. round-bottom flask equipped with septum inlet and magnetic stirring bar was flushed with nitrogen and maintained under a static pressure of the gas. Twenty ml. of a 1 M solution of triethylborane in tetrahydrofuran was injected into the flask followed by 1.78 g. (10 mmoles) of α-bromocyclohexanone. The flask was placed in an ice bath and stirring was initiated. Ten ml. of a 1 M solution of potassium t-butoxide in tetrahydrofuran was then added dropwise over a period of 5 minutes. The solution was analyzed periodically for 2-ethylcyclohexanone by GLPC and a yield of 68% after 12 hours reaction time was established.

In the case of phenacyl bromide the reaction is much faster. In this case analysis of the reaction mixture immediately following completion of the addition of the potassium t-butoxide indicated the reaction was already complete.

Representative results are summarized in Table III.

TABLE III.—REACTION OF REPRESENTATIVE α-BROMOKETONES WITH ORGANOBORANES UNDER THE INFLUENCE OF POTASSIUM t-BUTOXIDE

| Bromoketone [a] [b] | Organoborane | $R_3B$, mmoles | Temp., °C. | Time, hr. | Yield,[c] percent |
|---|---|---|---|---|---|
| Phenacyl bromide | Triethyl | 10 | 0 | 0.1 | 93 |
| | do | 20 | 0 | 0.1 | 100 |
| α-Bromocyclohexanone | do | 10 | 0 | 5.0 | 50 |
| | | | | 0.25 | 24 |
| | | | | 2.0 | 35 |
| | do | 20 | 0 | 5.0 | 50 |
| | | | | 12 | 68 |
| | | | | 48 | 68 |
| Do | do | 20 | 25 | 1.0 | 55 |
| | | | | (d) | 71 |
| Phenyl bromide | Tri-n-butyl | 10 | 0 | 0.1 | 61 |
| | | 10 | 0 | 0.1 | [e] 75 |
| | | 20 | 0 | 0.1 | 93 |
| | Tri-n-decyl | 20 | 0 | 0.1 | 90 |

[a] 10.1 mmoles.
[b] 10.1 mmoles of potassium t-butoxide was used except where otherwise indicated.
[c] GLPC analysis. The yield is based on the bromoketone.
[d] After 24 hours, the analysis revealed a yield of 58% with 10% of residual α-bromoketone. Addition of 2.0 mmoles of potassium t-butoxide raised the product to 71%.
[e] Simultaneous addition of the phenacylbromide and the base to the organoborane.

EXAMPLE VI

The following example illustrates the use of bases other than potassium t-butoxide.

In the usual flask 100 mmole of tricyclopentylborane and 100 mmole of sodium hydride in 200 ml. of tetrahydrofuran is stirred at 0° as 100 mmole of t-butyl bromoacetate was added. After one hour at 0°, sufficient water is added to dissolve the sodium bromide and the tetrahydrofuran layer is dried and analyzed. A nearly quantitative yield of t-butyl cyclopentylacetate is produced.

Having thus described the general nature and specific embodiments of the present invention, the true scope of the invention is now pointed out in the appended claims.

What is claimed is:

1. In a process for introducing an organic residue into the alpha position of organic molecules containing an activated alpha position wherein the α-halo derivatives of said molecules containing at least one hydrogen atom in the activated α-position are reacted with a base sufficiently strong to produce the α-halo carbanion, the improvement which comprises causing the α-halo carbanion to react with an organoborane of the formula $R_3B$ wherein R is alkyl, aryl or an alicyclic ring.

2. The process of claim 1 wherein the organic compound containing an activated alpha position is selected from the group consisting of an aldehyde, ketone, ester, nitrile, sulfone, and nitro compound containing at least one hydrogen atom in the activated alpha position in addition to not more than two halogen atoms.

3. The process of claim 1 in which the organic compound containing an activated alpha position is an α-halo aldehyde.

4. The process of claim 1 in which the organic compound containing an activated alpha position is an α-chloro aldehyde.

5. The process of claim 1 in which the organic compound containing an activated alpha position is an α-bromo aldehyde.

6. The process of claim 1 in which the organic compound containing an activated alpha position is α-chloroacetaldehyde.

7. The process of claim 1 in which the organic compound containing an activated alpha position is an α-chloro ketone.

8. The process of claim 1 in which the organic compound containing an activated alpha position is α-chloroacetone.

9. The process of claim 1 in which the organic compound containing an activated alpha position is an α-bromo ketone.

10. The process of claim 1 in which the organic compound containing an activated alpha position is α-bromocyclohexanone.

11. The process of claim 1 in which the organic compound containing an activated alpha position is phenacyl bromide.

12. The process of claim 1 in which the organic compound containing an activated alpha position is an α-halo ester.

13. The process of claim 1 in which the organic compound containing an activated alpha position is an α-haloacetate.

14. The process of claim 1 in which the organic compound containing an activated alpha position is an α-dihaloacetate.

15. The process of claim 1 in which the organic compound containing an activated alpha position is an α-chloro ester.

16. The process of claim 1 in which the organic compound containing an activated alpha position is an α-bromo ester.

17. The process of claim 1 in which the organic compound containing an activated alpha position is an α-chloroacetate.

18. The process of claim 1 in which the organic compound containing an activated alpha position is an α-bromoacetate.

19. The process of claim 1 in which the organic compound containing an activated alpha position is an α-dichloroacetate.

20. The process of claim 1 in which the organic compound containing an activated alpha position is an α-dibromoacetate.

21. In a process for introducing an organic residue into the alpha position of an organic molecule containing an activated alpha position wherein its α-halo carbanion is reacted with an organic compound, the improvement which comprises reacting said α-halo carbanion with an organoborane of the formula $R_3B$ wherein R is alkyl, aryl or an alicyclic ring at a temperature to cause reaction.

References Cited
UNITED STATES PATENTS
3,194,822   7/1965   Neiswender et al.   260—410.9
3,131,225   4/1964   Rutkowski et al.   260—606.5

OTHER REFERENCES
Brown et al.: "Reaction of Organoboranes With Ethyl Bromoacetate Under the Influence of Potassium t-Butoxide," J. Am. Chem. Soc., vol. 9(3) 818–820 (1968).

LEWIS GOTTS, Primary Examiner

C. L. MILLS, Assistant Examiner

U.S. Cl. X.R.

260—410.9, 465.1, 468 F, 468 R, 469, 476 R, 478, 487, 491, 586 R, 592, 593 R, 601 R, 607 A, 644